US012380408B2

(12) United States Patent
Medicke et al.

(10) Patent No.: US 12,380,408 B2
(45) Date of Patent: Aug. 5, 2025

(54) DESIGNING CONFLICT REDUCING OUTREACH STRATEGIES TO MITIGATE INEFFICIENCIES IN PROACTIVE SOURCING PROCESS

(71) Applicant: International Business Machines Corporation, Armonk, NY (US)

(72) Inventors: John Arthur Medicke, Raleigh, NC (US); Ramasuri Narayanam, Andhra Pradesh (IN); Sudhanshu Shekhar Singh, New Delhi (IN); Shweta Garg, New Delhi (IN); Gyana Ranjan Parija, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 16/999,733

(22) Filed: Aug. 21, 2020

(65) Prior Publication Data

US 2022/0058587 A1 Feb. 24, 2022

(51) Int. Cl.
*G06Q 10/1053* (2023.01)
*G06F 16/906* (2019.01)
(Continued)

(52) U.S. Cl.
CPC ....... *G06Q 10/1053* (2013.01); *G06F 16/906* (2019.01); *G06N 20/00* (2019.01); *G06N 3/006* (2013.01); *G06N 7/01* (2023.01)

(58) Field of Classification Search
CPC .. G06Q 10/1053; G06F 16/906; G06N 20/00; G06N 3/006; G06N 7/005; A63F 9/24;
(Continued)

(56) References Cited

U.S. PATENT DOCUMENTS

2003/0120531 A1 6/2003 Parker
2011/0106711 A1* 5/2011 Goyal ............ G06Q 10/063112
705/80

(Continued)

FOREIGN PATENT DOCUMENTS

GB 2558032 A 4/2018
WO WO-2010118170 A1 * 10/2010 ........... G06N 99/005

OTHER PUBLICATIONS

Larson, Sheryl A., and Amy S. Hewitt, Staff Recruitment, Retention, Training Strategies for Community Human Services Organizations, Published in WorldCat, Jul. 11, 2008.

*Primary Examiner* — Lynda Jasmin
*Assistant Examiner* — Shaun D Sensenig
(74) *Attorney, Agent, or Firm* — Ryan, Mason & Lewis, LLP

(57) ABSTRACT

Methods, systems, and computer program products for designing conflict minimizing outreach strategies are provided herein. A computer-implemented method includes obtaining data from a job matching service corresponding to jobs listed on the job matching service and candidates; generating job clusters for the jobs based on clustering criteria; identifying, for each respective one of the job clusters, a set of candidates from among the candidates to reduce inter-cluster conflict; selecting, for each of the jobs in a given one of the job clusters, individual candidates from among the set of candidates corresponding to the given job cluster to reduce intra-cluster conflict with respect to the plurality of candidates; and outputting one or more optimized lists of the candidates for the jobs based on the identifying and the selecting.

20 Claims, 8 Drawing Sheets

(51) Int. Cl.
  *G06N 3/006*   (2023.01)
  *G06N 7/01*    (2023.01)
  *G06N 20/00*   (2019.01)

(58) Field of Classification Search
  CPC .... A63F 13/00; A63F 1/00; A63F 3/08; A63F 3/06; G07F 17/3227; G07F 17/3269
  See application file for complete search history.

(56) References Cited

U.S. PATENT DOCUMENTS

| | | | |
|---|---|---|---|
| 2012/0209756 A1* | 8/2012 | El-Sakkout | G06Q 40/04 705/37 |
| 2014/0122355 A1* | 5/2014 | Hardtke | G06Q 10/1053 705/321 |
| 2016/0162840 A1 | 6/2016 | Roberts et al. | |
| 2017/0148042 A1* | 5/2017 | Sullivan | G06Q 30/0204 |
| 2017/0161686 A1* | 6/2017 | Dyrvig | G06Q 10/1053 |
| 2017/0228696 A1* | 8/2017 | Brdiczka | G06Q 10/1053 |
| 2019/0114593 A1 | 4/2019 | Champaneria | |
| 2019/0188646 A1* | 6/2019 | Ahuja | G06Q 10/06311 |
| 2019/0197486 A1 | 6/2019 | Jersin et al. | |
| 2020/0005216 A1* | 1/2020 | Dai | G06Q 10/1053 |
| 2020/0210957 A1* | 7/2020 | Gaspar | G06Q 10/1053 |

* cited by examiner

DESIGNING CONFLICT REDUCING OUTREACH STRATEGIES TO MITIGATE INEFFICIENCIES IN PROACTIVE SOURCING PROCESS

BACKGROUND

The present application generally relates to information technology and, more particularly, to proactive sourcing processes for job matching software systems.

Businesses are increasingly relying on job matching and/or recruiting software to perform, for example, sourcing and outreaching of job candidates. Existing software identifies and recommends candidates for jobs independently and does not consider whether similar job openings exist within the same organization (either within the same business unit or different business units). This can impact recruiting yield, hurt the reputation of the organization, and also cause inefficiencies in the job matching software.

SUMMARY

In one embodiment of the present disclosure, techniques for designing conflict reducing outreach strategies are provided. An exemplary computer-implemented method includes the steps of obtaining data from a job matching service, the data corresponding to a plurality of jobs listed on the job matching service and a plurality of candidates; generating one or more job clusters for the plurality of jobs based on one or more clustering criteria, wherein each of the generated job clusters comprises one or more of the plurality of jobs; identifying, for each respective one of the job clusters, a set of candidates from among the plurality of candidates, wherein the identifying comprises reducing inter-cluster conflict with respect to the plurality of candidates; selecting, for each of the jobs in a given one of the job clusters, individual candidates from among the set of candidates corresponding to the given job cluster, wherein the selecting comprises reducing intra-cluster conflict with respect to the plurality of candidates; and outputting one or more optimized lists of the plurality of candidates for the plurality of jobs based on the identifying and the selecting.

Another exemplary computer-implemented method includes obtaining data from a job matching service, the data corresponding to (i) a plurality of jobs listed on the job matching service and (ii) one or more lists of candidates for each of the plurality of jobs, wherein each of the one or more lists is ranked by a respective one of a plurality of recruiters; generating one or more job clusters for the plurality of jobs based on one or more clustering criteria, wherein each of the generated job clusters comprises one or more of the plurality of jobs; initializing, based at least in part on the ranked lists, a collaborative artificial intelligent assistant for each of the plurality of recruiters; implementing, using a collaborative artificial intelligence framework, at least one public goods game between at least a portion of the collaborative artificial intelligent assistants to identify candidates for the open jobs to reduce (i) inter-cluster conflict of the plurality of jobs between the recruiters and (ii) intra-cluster conflict of the plurality of jobs between the recruiters; and outputting, to the job matching service, one or more optimized lists of the plurality of candidates for the plurality of jobs based on results of the at least one public goods game.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Traditionally, job matching systems identify and recommend candidates for jobs, independently. At any given time, there might be similar open jobs from the same employer, but from different business units (BUs) (e.g., consulting, technology, research, etc.). Each business unit may have different recruiters with different business goals. As a result, the set of open jobs may be segmented into as many mutually exclusive subsets as the number of BUs.

If candidates are recommended for jobs independently, then the same candidate might be recommended for multiple jobs within the same BU or multiple jobs spanning multiple BUs. Such situations can result in conflicting scenarios. For example, two different BUs may potentially, simultaneously target the same candidate pool to acquire top talent per their strategy. Generally, there are no provisions for resolving these types of conflicts. Frequently, both recruiters may start pursuing the candidate more aggressively to meet their individual targets, and the candidate may choose to pursue both jobs. This can impact the recruiting yield (as the candidate may join only one of the positions). When recruiters from different BUs of the same company target a single candidate, it can leave the impression that the company lacks efficiency and organization, thus deterring the candidate from pursuing either opportunity.

As described herein, an exemplary embodiment includes a job candidate match service that considers the entire candidate pool for each job and ranks candidates with respect to the jobs (e.g., decreasing order of scores). Sets of candidates for clusters of jobs are identified with minimal overlap across clusters, and candidates for individual jobs are identified within each of the cluster as described herein.

Figure 1:
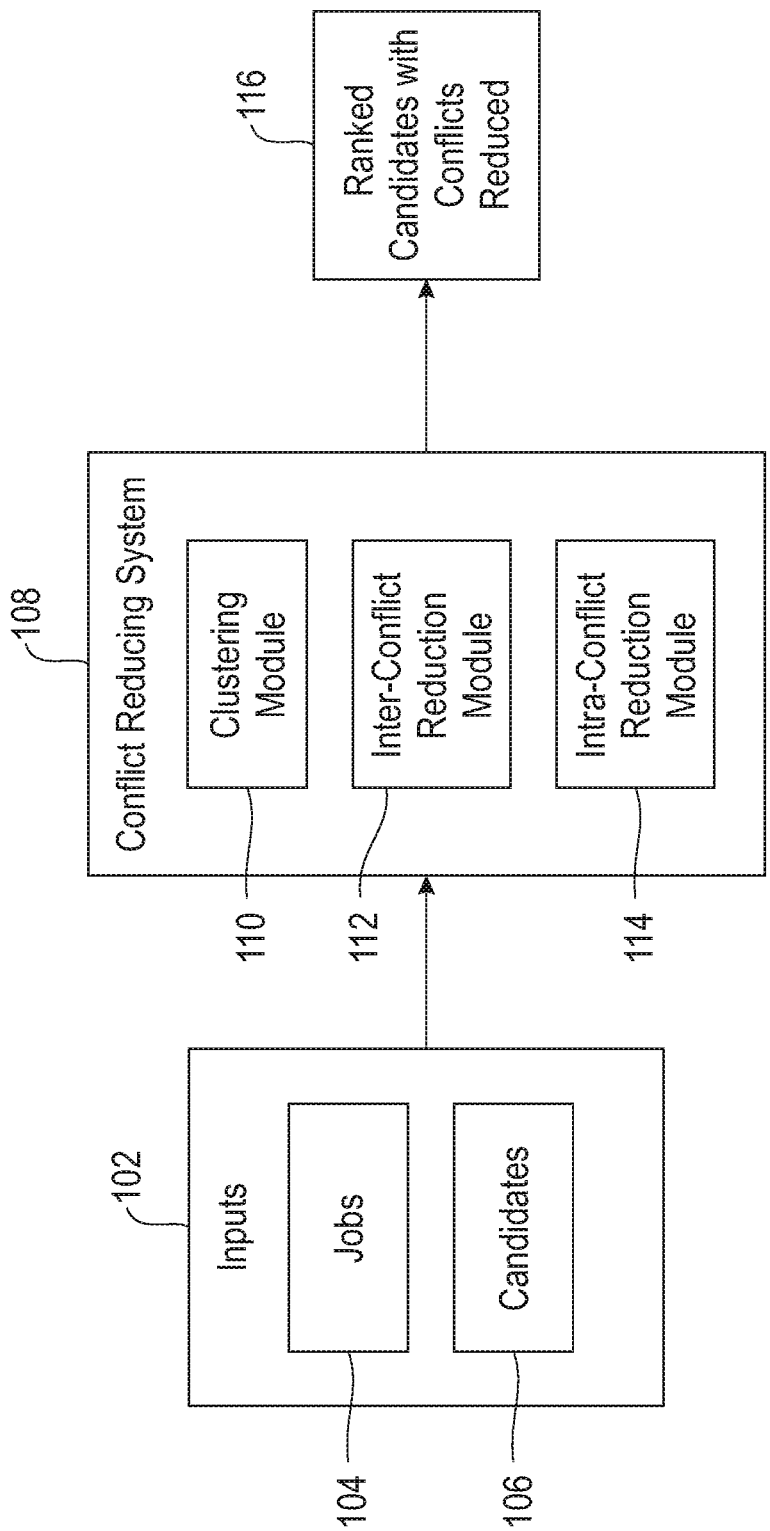
FIG. 1 is a diagram illustrating a system architecture in accordance with exemplary embodiments.

FIG. 1 is a diagram illustrating a system architecture in accordance with exemplary embodiments. By way of illustration, FIG. 1 depicts a conflict reducing system 108, which includes a clustering module 110, an inter-conflict reduction module 112, and an intra-conflict reduction module 114. The conflict reducing system 108 obtains inputs 102 comprising a plurality of jobs 104 and a plurality of candidates 106.

The clustering module 110 clusters the jobs, which may be based on one or more rules or criteria. The rules may comprise, for example, a rule that considers a similarity criteria of the jobs, a rule specifying that jobs from a single BU are placed in the same cluster, or a combination thereof (similar jobs within the same BU for a cluster).

Given prioritization of different jobs, and their rank ordered list, the inter-conflict reduction module 112 and the intra-conflict reduction module 114 reduce conflict at a global and cluster level, respectively, such as by solving optimization problems. The overlap of candidates across clusters and jobs may be reduced as described in more detail herein. By way of example, the prioritization of different jobs and their rank ordered list may be determined using recruiting software (e.g., IBM® Watson Recruitment).

In at least one example embodiment, the conflict reducing system 108 identifies career paths (as opposed to a single job) for the candidates 106. The conflict reducing system 108 may then generate output in the form of, for example, a ranking of candidates for the jobs with conflicts reduced 116 (e.g., with respect to candidates across clusters and jobs).

Figure 2:
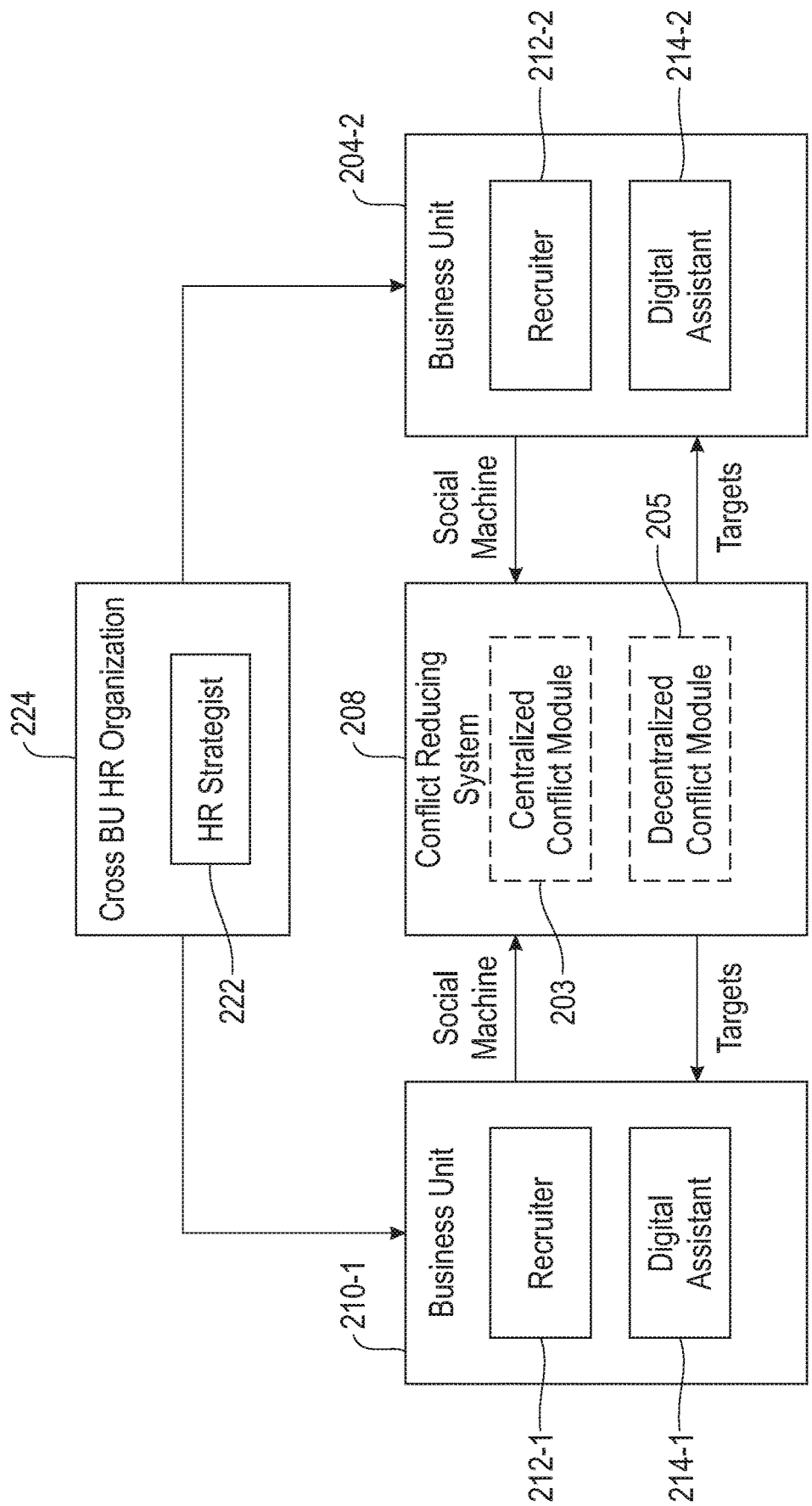
FIG. 2 is a diagram illustrating an example of a proactive sourcing system in accordance with exemplary embodiments.

Referring now to FIG. 2, this figure shows an example of a conflict reducing system 208 in accordance with exemplary embodiments. The conflict reducing system 208 may be implemented similarly as mentioned above for conflict reducing system 108. In this example, the conflict reducing system 208 comprises one or more of a centralized conflict module 203 and a decentralized conflict module 205.

The FIG. 2 embodiment also depicts a cross BU organization 224, which includes an HR strategist 222 that is associated with BU 210-1 and BU 204-2. The HR strategist 222 predicts areas of change in the organization and forecasts staffing requirements for each of the BUs 210-1, 204-2. In this example, it is assumed that each of the BUs 210-1, 204-2 have a corresponding cluster of jobs (for example, as described above with respect to FIG. 1). Each of the BUs also includes a recruiter (i.e., recruiters 212-1 and 212-2) that, for example, identifies and ranks candidates for the jobs in the respective clusters. It is noted that each of the BUs may also include, for example, hiring managers and interview panels that screen and interview potential candidates. In the FIG. 2 embodiment, the digital assistants 214-1, 214-2 of the recruiters manage the job clusters of the respective BUs. The digital assistants 214-1, 214-2 are configured to allocate candidates to jobs within the cluster and can coordinate with other digital assistants to minimize inter-cluster conflicts while increasing the overall quality of the match.

In at least one example embodiment, the centralized conflict module 203 may implement a digital orchestrator that enables the agents to collaborate such as, for example, by providing them feedback on public utility and rewarding/penalizing them based on their cooperation. In situations when it is feasible for the centralized conflict module 203 to have access to all of the data (and enough computational resources), the centralized conflict module 203 solves the problem of candidate assignment to clusters to optimality. The centralized conflict module 203 may not have access to all the data when, for example, there are different applications for hiring internally, externally, and out in the open marketplace. In such cases, these applications often cannot communicate with each other.

In situations when computing resources are not adequate, the problem can be solved approximately. Even if enough computing resources are available to the centralized conflict module 203 to solve the centralized problem, it still might not be feasible to keep the parameters updated to reflect the exact existing business scenario.

In at least one example embodiment, the decentralized conflict module 205 determines a final allocation (optionally, using the allocation from the centralized conflict module as a starting point) by configuring a social machine, wherein the digital assistants 214-1 and 214-2 are players in the social machine. For example, the decentralized conflict module may configure a public goods game between the digital assistants 214-1 and 214-2 to finalize the list of candidates for their clusters of jobs, which are then output as targets by the conflict reducing system 208. For example, a basic public goods game may include a set of players that each start with a certain number of private tokens, and the players secretly choose how many of their private tokens to put into a public pot. The tokens in this pot are then multiplied by a factor (e.g., greater than one and less than the number of players, N) and this "public good" payoff is evenly divided among players. Each player also keeps the tokens they do not contribute. The group's total payoff is maximized when everyone contributes all of their tokens to the private pool. It is to be appreciated that this is merely an example of a public goods games, and there are other variants such as iterated public goods games, for example. Additionally, the conflict reducing system 208 may ensure that the same candidate is not targeted for the same job opportunity before a specified period of time. Further details of the centralized and decentralized methods implemented by the conflict reducing system 208 are discussed in more detail below.

Centralized Method

For the centralized method (which may be implemented at least in part by centralized conflict module 203), let $j_1$, $j_2$, ... $j_n$ be a set of jobs and $c_1$, $c_2$, ... $c_n$ be a set of candidates. A set of clusters of jobs is defined as $J_1, J_2, \ldots J_n$ in which each job belongs to only one cluster. It is noted that a candidate may be aligned with jobs in multiple clusters.

Jobs in each cluster of jobs may be associated with individual rank orders or scores of candidates. According to exemplary embodiments, a unified rank order of candidates for each cluster of jobs is created using one or more of a centralized rank aggregation method and a collaborative cognition-based rank aggregation method depending upon the size of problem. It is noted that while individual jobs be assigned a priority, the clusters do not have an implicit notion of priority. The priority of a cluster may be defined as the average of the priorities of the jobs within it.

Candidates are assigned to each cluster based on one or more of constraints, such as, for example, a specified minimum number of recommendations for each job, at least a certain number of candidates having a match score/rank above a threshold value for each job, at least a certain number of candidates for each job with a match score that is greater than a job priority parameter, and that each assignment maximizes other metrics (such as, for example, overall match quality). This may be implemented by solving an integer program or training a reinforcement learning based model to optimize a loss function. Candidates are then assigned to individual jobs within clusters using a similar methodology function.

Once candidate-job maps are identified, the centralized method may identify a certain number of top career paths from a set of pre-computed career paths that match a profile of the candidate. The recruiter may then be advised of target candidates and career paths for one or more of the jobs.

The centralized process may be applied to, for example, the following two scenarios:
- When the scores of the various candidates for a given job are known (e.g., when the same method of calculating match scores is deployed across the whole enterprise).
- When the scores of the various candidates for a given job are not known/equitable, and only the rank order among the candidates is known (e.g., when different BUs use different methods of finding the match scores, or when users have the choice of adjusting with the order of candidates produced for a job by an automated match service).

The basic model for when the scores are known may be expressed as:

$s_{ij}$=Score of Candidate i with respect to job j $$x_{ij} = \begin{cases} 1 \text{ if candidate } i \text{ is assigned to job } j \\ 0 \text{ otherwise} \end{cases}$$

Min $\beta_1 \Sigma_i y_i + \beta_2 \Sigma_j s_j + \beta_3 \Sigma_j t_j$, where $\beta_1, \beta_2, \beta_3$ are constants that represent the relative importance of satisfying the three constraints.

The minimization equation above, may be subject to the following constraints:
Each job must have at least n candidates assigned to it, for example:

$\Sigma_i x_{ij} \geq n - s_j \forall j$

Each job must have at least r candidates with score above a threshold t, for example:

$\Sigma_i x_{ij} I_{ij} \geq r - t_j \forall j$, where $I_{ij}$ is an indicator, indicating if candidate i is scored higher than t with respect to job j An overlap variable, for example, $\Sigma_j x_{ij} \leq y_i \forall I$.

One or more example embodiments may include further objectives and/or constraints, including one or more of:
An average score (over matched candidates) for each job is at least $\bar{s}$, for example:

$\Sigma_i x_{ij} s_{ij} \geq \bar{s} \Sigma_i x_{ij} - b_j \forall j$

In order to minimize maximum conflict, a variable y may be defined as:

$y \geq y_i \forall i$

Min $\beta_1 y + \beta_2 \Sigma_j s_j + \beta_3 \Sigma_j t_j$

The following may be used to maximize allocated score assignment (assuming score is out of a 100):

Min $\beta_1 y + \beta_2 \Sigma_j s_j + \beta_3 \Sigma_j t_j + \beta_4 \Sigma_{ij} x_{ij}(100 - s_{ij})$, where $\beta_1, \beta_2, \beta_3, \beta_4$ are constants that represent the relative importance of satisfying the three constraints and score and $p_j$ is the priority of job j More weight may be given to higher priority jobs based on the following:

Min $\beta_1 y + \beta_2 \Sigma_j s_j + \beta_3 \Sigma_j t_j + \beta_4 \Sigma_{ij} x_{ij}(100 - s_{ij}) p_j$ A constraint to ensure that certain candidates are not approached:

$x_{ij} \leq t_{ij}$, where $t_{ij}$ indicates if i-j allocation is allowed.

It is noted that y can be replaced by $\Sigma_i y_i$ in either of the objective functions to go back to minimizing conflict.

The basic model for when only rank orders are known may be expressed as:

$r_{ij}$=Rank of Candidate i with respect to job j $$x_{ij} = \begin{cases} 1 \text{ if candidate } i \text{ is assigned to job } j \\ 0 \text{ otherwise} \end{cases}$$

Min $\beta_1 \Sigma_i y_i + \beta_2 \Sigma_j s_j + \beta_3 \Sigma_j t_j$

The basic model for when only rank orders are known may be subject to the one or more of the following constraints:
Each job must have at least n candidates assigned to it, for example:

$\Sigma_i x_{ij} \geq n - s_j \forall j$

Each job must have at least r candidates with rank above a threshold t (which can be job priority dependent), for example:

$\Sigma_i x_{ij} I_{ij} \geq r - t_j$, where $I_{ij}$ is an indicator indicating if candidate I is ranked higher than t with respect to job j.

Additionally, in at least one example embodiment, further constraints may include one or more of:
Average rank (over matched candidates) for each job is at least $\bar{r}$, for example:

$\Sigma_i x_{ij} r_{ij} \geq \bar{r} \Sigma_i x_{ij} - b_j \forall j$

To minimize maximum conflict, a variable y may be defined as:

$y \geq y_i \forall i$

Min $\beta_1 y + \beta_2 \Sigma_j s_j + \beta_3 \Sigma_j t_j$

To maximize allocated rank assignment, for example:

Min $\beta_1 y + \beta_2 \Sigma_j s_j + \beta_3 \Sigma_j t_j + \beta_4 \Sigma_{ij} x_{ij} r_{ij}$ To give more weightage to higher priority jobs, for example:

Min $\beta_1 y + \beta_2 \Sigma_j s_j + \beta_3 \Sigma_j t_j + \beta_4 \Sigma_{ij} x_{ij} r_{ij} p_j$ A constraint to ensure that certain candidates are not approached:

$x_{ij} \leq t_{ij}$, where $t_{ij}$ indicates if i-j allocation is allowed

It is noted that y can be replaced by $\Sigma_i y_i$ in either of the objective functions to go back to minimizing conflict.

The centralized method may include solving a large mixed integer problem, and such problems can require significant time (e.g., multiple days) to solve. In at least some example embodiments, one or more constraints may be provided to reduce the time needed to solve the mixed integer problem. For example, the constraints may include a certain time limit to solve the problem or a constraint for solving the problem until a certain degree of accuracy is obtained.

Even if the problem can be optimally solved, there is no optimal way to come up with acceptable weights. Weights provided by subject matter expert assessments can be used, but this would not allow users the option to change the solution in a decentralized framework. Adding a layer of decentralized decision making on top of it will help in modifying the solvers' solution to get good business results. In addition, multiple optimal solutions may exist, and a decentralized process gives users an opportunity to explore other solutions which are as good, or close to as good, as the optimal solution. These can then be incorporated into other preferences that might be missed by the centralized system.

Decentralized Process

One or more example embodiments implement a decentralized process for conflict resolution when no central authority exists, or when the entire optimization problem is computationally too expensive to solve.

Initially, recruiters may obtain individual lists of candidates (or targets) to engage with. The recruiter may solve the individual assignment problem using, for example, the centralized method. Collaborative decision-making games (e.g., one or more public goods games) are then played among groups of recruiters (e.g., digital assistants), wherein the groups are decided based on a number of common candidates between pairs of the individual lists of the recruiters. A disjointed set of recruiters who have at least one common candidate amongst themselves are members of one group. It is noted that the same recruiter can be part of more than one group. During the collaborative decision-making games, each recruiter tries to keep the original list of candidates intact, while trying to cooperate. The global objective is the same as that for the centralized process. Each recruiter's decision to increase or decrease the objective and reward/penalty points are accumulated by recruiters based on the change they cause in the global objective. In some examples, recruiters with more reward points may obtain veto power in exchange for their points, as incentive to cooperate with others.

Following the decentralized methodology, each recruiter may convert their respective rank order of the candidates into a probability distribution. For example, the rank order $S_i$ of player i may be $(r_{i1}, r_{i2}, \ldots, r_{in})$, the following expression may be used to convert this rank ordering into a probability distribution (which forms the initial collaboratively updated rank order $z_i$ for player i):

$$z_i = \left( \frac{\frac{1}{r_{i_1}}}{\sum_{j=1}^{n} \frac{1}{r_{i_j}}}, \frac{\frac{1}{r_{i_2}}}{\sum_{j=1}^{n} \frac{1}{r_{i_j}}}, \ldots, \frac{\frac{1}{r_{i_n}}}{\sum_{j=1}^{n} \frac{1}{r_{i_j}}} \right)$$

Given the collection of neighbor players' distributions $z_j$, for each neighbor j of player i, the following expression is used to derive an updated strategy/distribution of player i:

$$z_i^{t+1} = \frac{\alpha_i s_i + (1 - \alpha_i) \sum_{j \in N(i)} w_{i,j}^t z_j^t}{\alpha_i + (1 - \alpha_i) \sum_{j \in N(i)} w_{i,j}^t}$$

where $w_{i,j}^t$ is defined as $$w_{i,j}^t = \left( \sqrt{\sum_{k \in N(i)} s_{i_k} (z_{ik}^t - z_{jk}^t)^2} + 1 \right)^{-1}.$$

Figure 3:
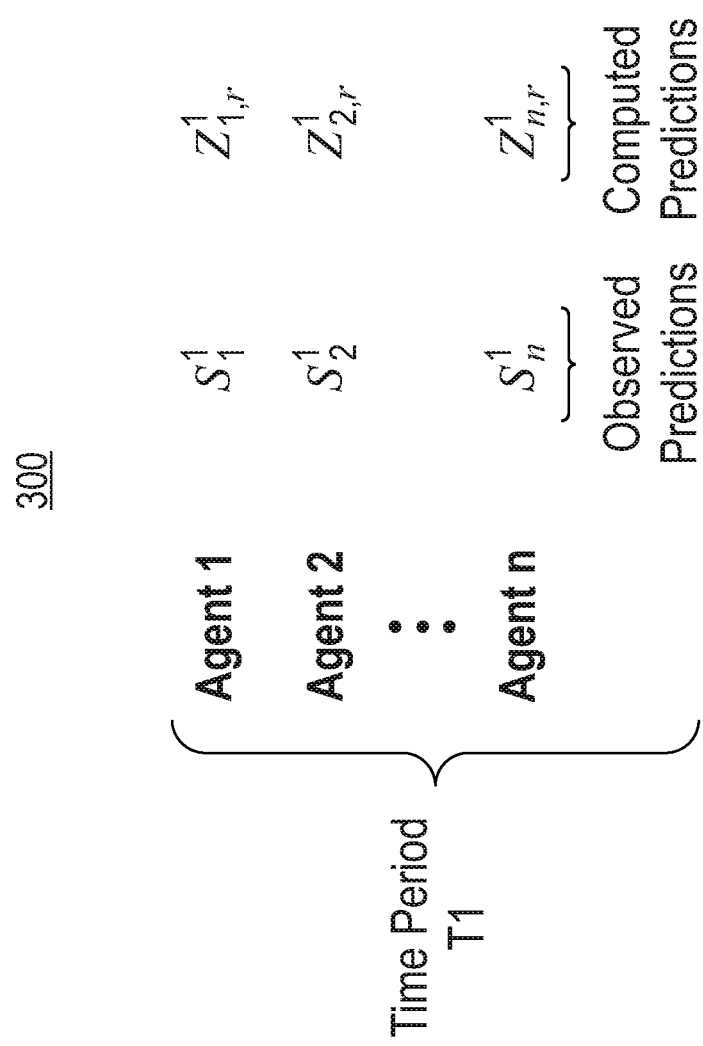
FIG. 3 is a diagram illustrating techniques in accordance with a decentralized process in accordance with exemplary embodiments.

The players participate in a repeated interaction over multiple rounds, wherein in each round, each player repeatedly updates its distribution $z_i$ given its neighbors distributions $z_{js}$. FIG. 3 shows an example of a table 300 that includes observed and computed predictions for a given time period.

This process is continued until a convergence criterion is met. For example, in one example embodiment the convergence criterion is based on Jenson-Shannon Divergence between the probability distributions of agent i in two successive rounds, and is expressed as:

$$\text{dist}(z_{i,k}^t, z_{i,k-1}^t) = \sqrt{JS(z_{i,k}^t, z_{i,k-1}^t)} \leq \delta$$

where $JS(z_{i,k}^t, z_{i,k-1}^t) = [0.5 KL(z_{i,k}^t \| M) + 0.5 KL(z_{i,k-1}^t \| M)]$ $M = [0.5 z_{i,k}^t + 0.5 z_{i,k-1}^t]$ Let $W_{i,j}$ represent the weight of the connection between player i and player j. The weights for the players can be derived using specific data sources or based on a confidence score, which then are normalized. If no additional data is available to derive the weights and no information is available on confidence score, then it is assumed that all the weights are the same (e.g., 1).

Figure 4:
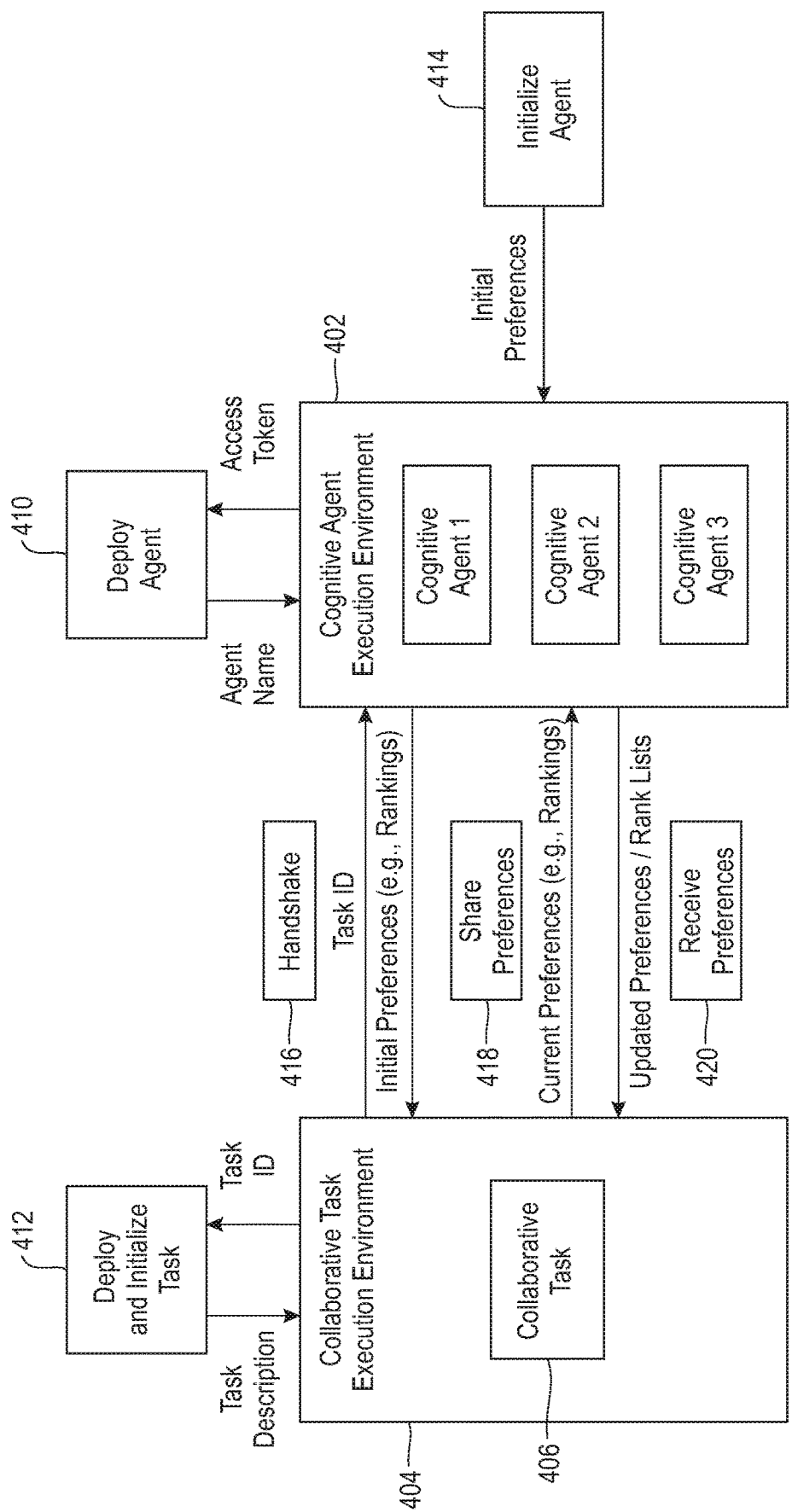
FIG. 4 is a process flow diagram for collaborative interactions between recruiters and digital agents in an illustrative embodiment.

FIG. 4 shows an agent architecture for collaborative interactions between recruiters and digital agents in an illustrative embodiment.

Step 410 includes deploying a cognitive agent to the cognitive agent execution environment 402. The cognitive agent may be deployed by a recruiter via an agent creation application programming interface (API). For example, in response to providing an agent name, agent creation API may return an access token for the corresponding cognitive agent. In the example shown in FIG. 4, three cognitive agents have been deployed, namely, cognitive agents 1-3.

Step 412 includes deploying and initializing a collaborative task to the collaborative task execution environment 404. The task may be, for example, a rank aggregation task to be performed by the cognitive agents. For example, the task may be initialized and deployed by a task host (not shown in FIG. 4) using a task deployment API, wherein the task host provides a description of the task and the API returns a task identifier (ID) for that task description.

Step 414 includes initializing the deployed agents using an agent initialization API based on the access token from step 410. Each of the deployed cognitive agents is initiated with an initial set of preferences (or rankings).

Step 416 includes initiating a handshake process between the collaborative task execution environment 404 and the cognitive agent execution environment 402. The handshake process includes the collaborative task execution environment 404 sending the task ID from step 412 to the cognitive agent execution environment 402, and, in response, receiving the initial set of preferences of each collaborative agent from the cognitive agent execution environment 402.

The collaborative task execution environment 404 executes the collaborative task 406 as described elsewhere herein. For example, step 418 includes sharing the current preferences/ranked lists with the cognitive agent execution environment 402 after each task round. Step 420 includes obtaining the updated preferences/ranked lists of the cognitive agents, which are then used in the subsequent task round. This process is repeated until a convergence criterion is met.

Figure 5:
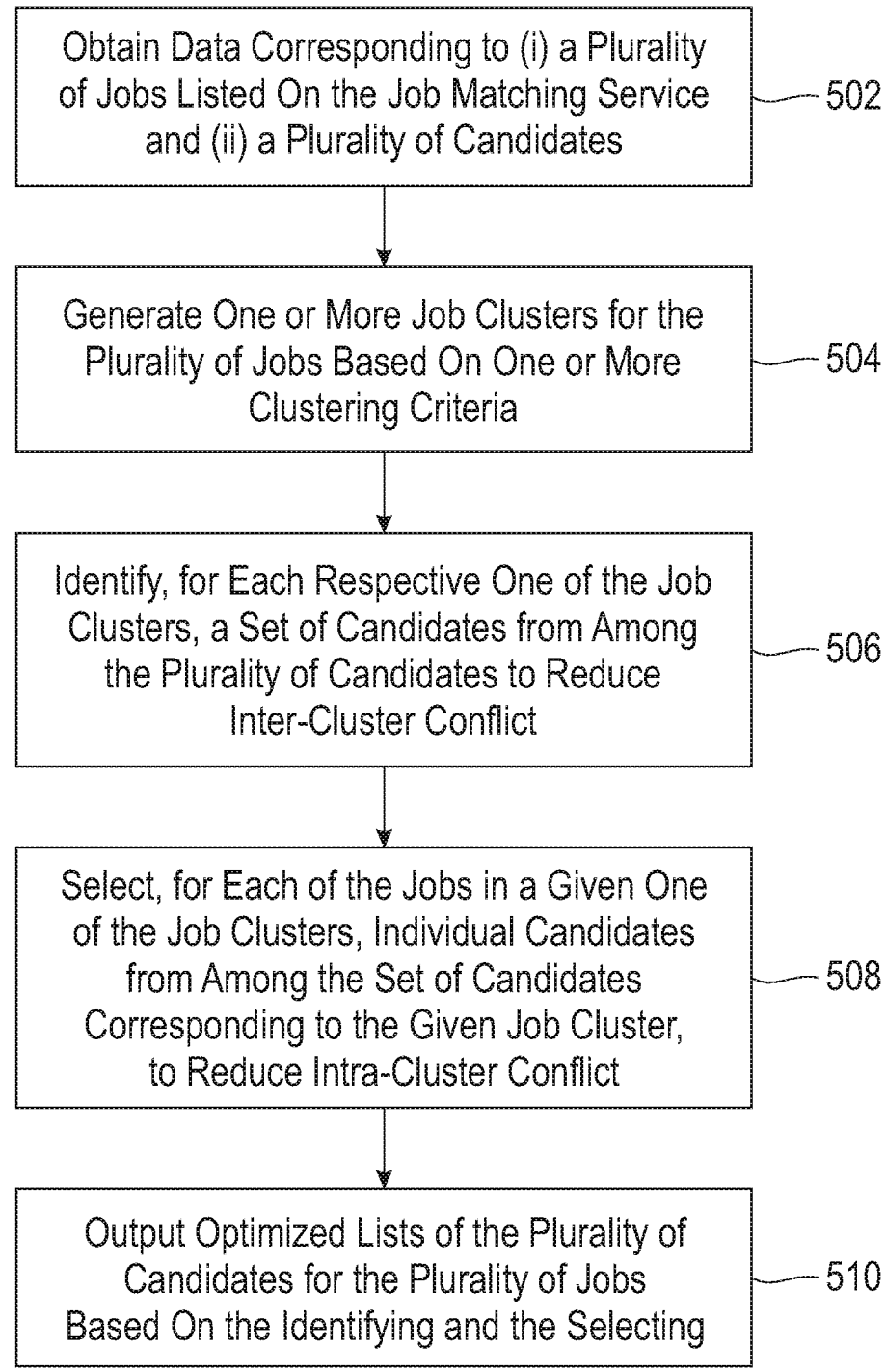
FIG. 5 is a flow diagram illustrating techniques in accordance with exemplary embodiments.

FIG. 5 is a flow diagram illustrating techniques in accordance with exemplary embodiments. Step 502 includes obtaining data from a job matching service, the data corresponding to (i) a plurality of jobs listed on the job matching service and (ii) a plurality of candidates. Step 504 includes generating one or more job clusters for the plurality of jobs based on one or more clustering criteria, wherein each of the generated job clusters comprises one or more of the plurality of jobs. Step 506 includes identifying, for each respective one of the job clusters, a set of candidates from among the plurality of candidates, wherein the identifying comprises reducing inter-cluster conflict with respect to the plurality of candidates. Step 508 includes selecting, for each of the jobs in a given one of the job clusters, individual candidates from among the set of candidates corresponding to the given job cluster, wherein the selecting comprises reducing intra-cluster conflict with respect to the plurality of candidates. Step 510 includes outputting one or more optimized lists of the plurality of candidates for the plurality of jobs based on the identifying and the selecting.

The one or more clustering criteria may include one or more of: a similarity between at least two or more of the plurality of jobs; and whether at least two of the plurality of jobs are associated with a same segment of a particular business entity. The process depicted in FIG. 5 may further include a step of obtaining preference data from a plurality of recruiters, wherein the preference data from a given one of the recruiters ranks at least a portion of the plurality of candidates with respect to at least one of the plurality of jobs. The process depicted in FIG. 5 may include a step of generating unified scores for each of the plurality of candidates for each of the job clusters based on at least a portion of the preference data. Reducing the inter-cluster conflict and reducing the intra-cluster conflict may include at least one of ensuring a minimum number of candidates are selected for each of the plurality of jobs; and ensuring a minimum number of candidates having unified scores exceeding a threshold value for a particular one of the jobs is selected for the particular job. The threshold value may be based on a priority of the particular job relative to the other jobs. Generating the unified scores may include one or more of: performing a centralized rank aggregation process; and a collaborative cognition-based rank aggregation process. The collaborative cognition-based rank aggregation process may include implementing a public goods game using a collaborative artificial intelligence framework, wherein the unified scores are based at least in part on results of the public goods game. Implementing the public goods game may include initializing an artificial intelligence agent for each of the plurality of recruiters to play the public goods game. At least one of the identifying and the selecting may include solving a mixed integer problem. At least one of the identifying and the selecting may include training a reinforcement-based machine learning model to optimize a loss function.

Another exemplary embodiment includes a process comprising obtaining data from a job matching service, the data corresponding to (i) a plurality of jobs listed on the job matching service and (ii) one or more lists of candidates for each of the plurality of jobs, wherein each of the one or more lists is ranked by a respective one of a plurality of recruiters; generating one or more job clusters for the plurality of jobs based on one or more clustering criteria, wherein each of the generated job clusters comprises one or more of the plurality of jobs; initializing, based at least in part on the ranked lists, a collaborative artificial intelligent assistant for each of the plurality of recruiters; implementing, using a collaborative artificial intelligence framework, at least one public goods game between at least a portion of the collaborative artificial intelligent assistants to identify candidates for the open jobs to reduce (i) inter-cluster conflict of the plurality of jobs between the recruiters and (ii) intra-cluster conflict of the plurality of jobs between the recruiters; and outputting, to the job matching service, one or more optimized lists of the plurality of candidates for the plurality of jobs based on results of the at least one public goods game.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 6:
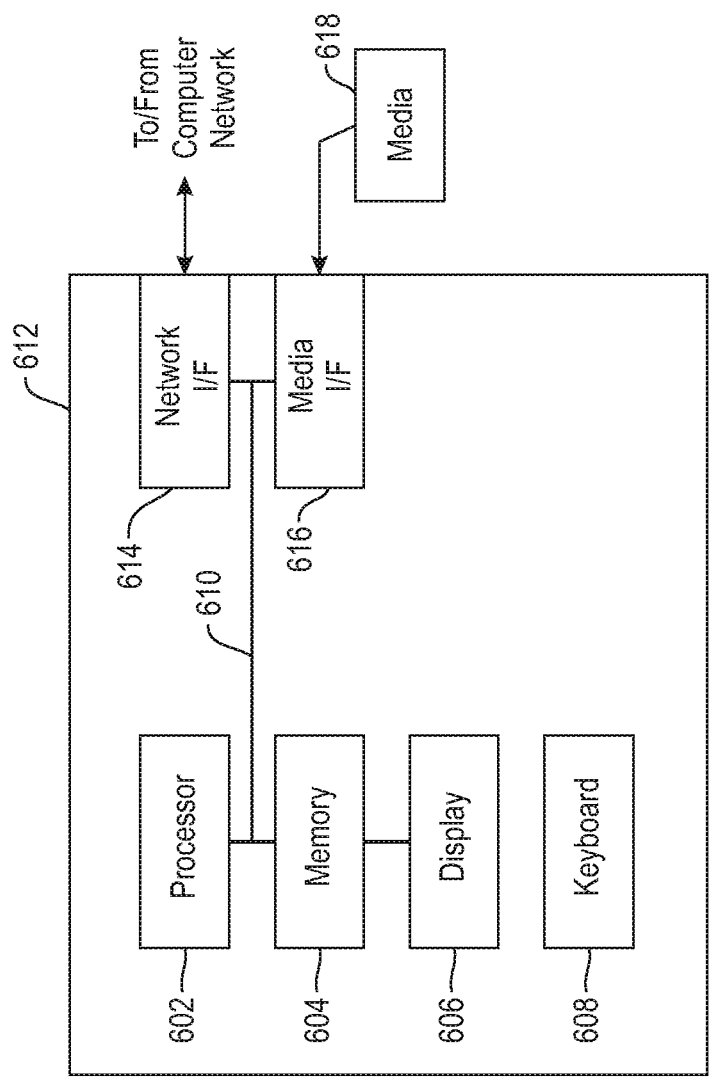
FIG. 6 is a system diagram of an exemplary computer system in which at least one embodiment of the present disclosure can be implemented.

Additionally, an embodiment of the present disclosure can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
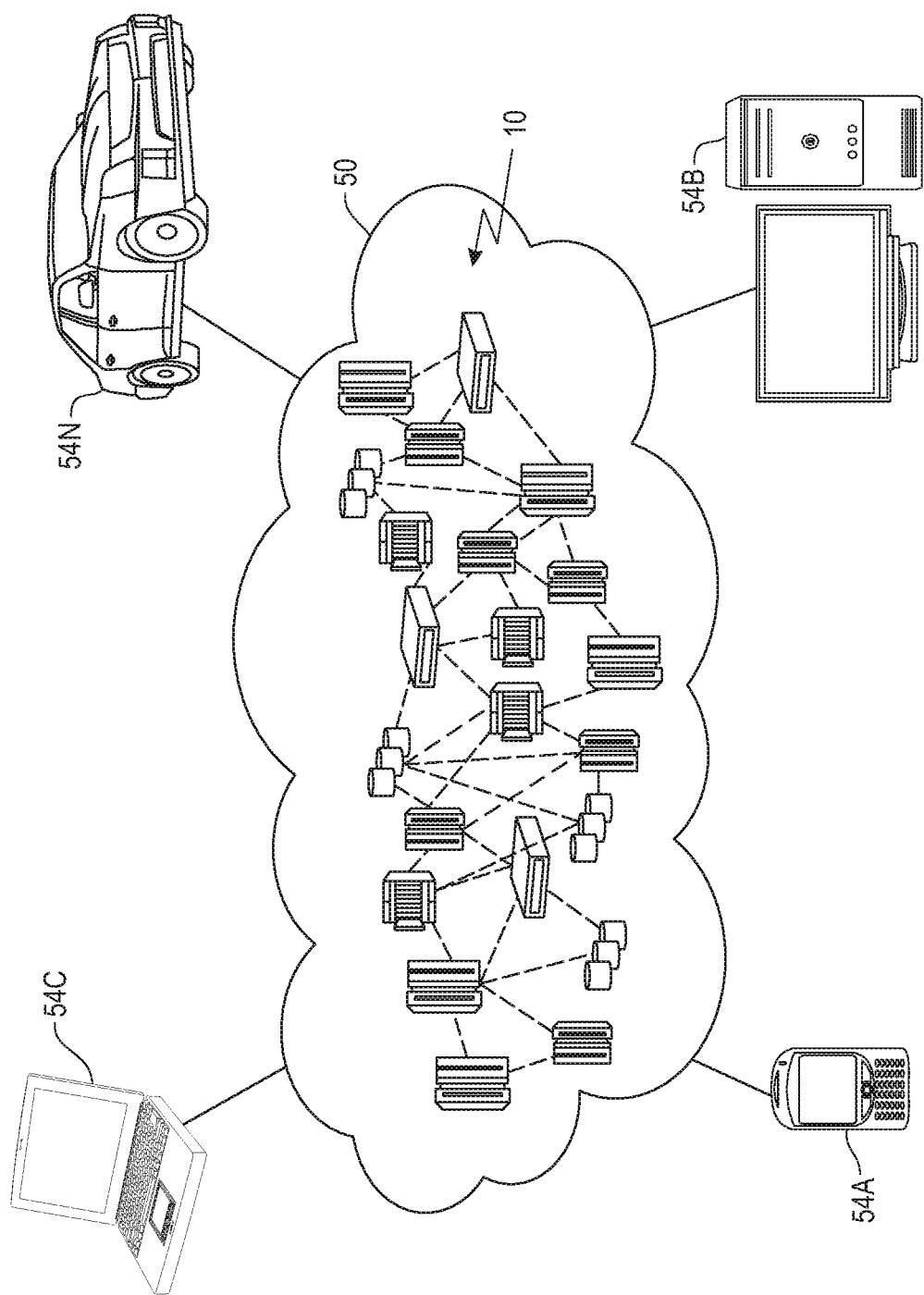
FIG. 7 depicts a cloud computing environment in accordance with exemplary embodiments.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
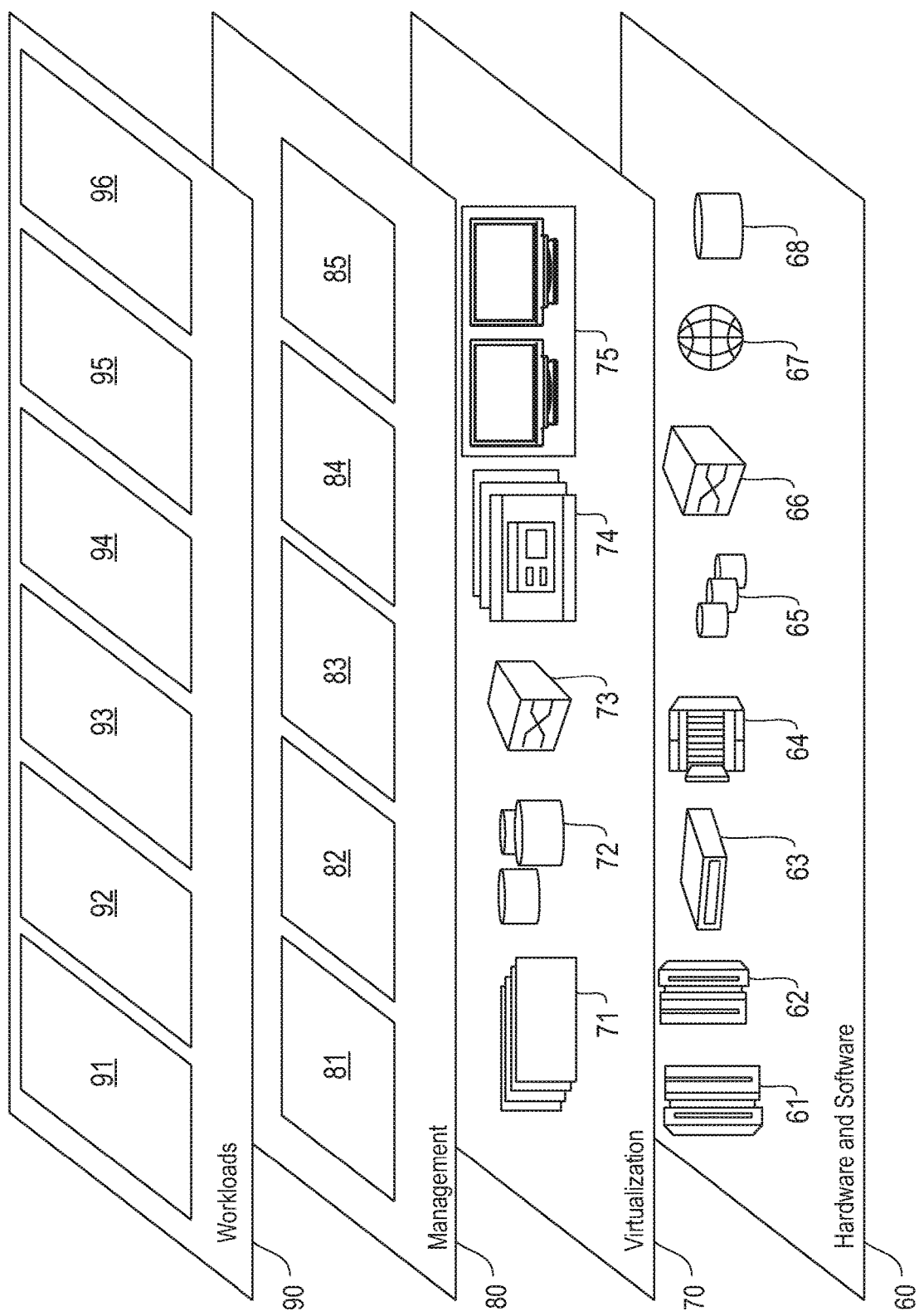
FIG. 8 depicts abstraction model layers in accordance with exemplary embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and designing conflict minimizing outreach strategies 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, improves the efficiency of job matching services minimizing conflicts in the proactive sourcing process.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
obtaining data corresponding to a plurality of jobs from at least two job data sources and a plurality of candidates from a job matching service;
processing the obtained data from the at least two job data sources using a clustering process to generate a plurality of job clusters, wherein each of the job clusters comprises one or more of the plurality of jobs;

identifying, for each respective one of the job clusters, a set of candidates from among the plurality of candidates, wherein said identifying comprises reducing inter-cluster conflict with respect to the plurality of candidates using a mixed integer programming process, wherein the mixed integer programming process is constrained by one or more computing resource limitations corresponding to at least one of memory and processing resources, and wherein the mixed integer programming process is further constrained by a specified candidate overlap threshold between the generated job clusters and a minimum number of candidates required for each of the jobs;

obtaining one or more rankings from one or more respective users of a plurality of users associated with the job matching service, wherein a given one of the rankings ranks at least a portion of said plurality of candidates with respect to at least one of the plurality of jobs;

deploying each of a plurality of artificial intelligence software agents to an agent execution computing environment with a respective set of initial rankings, wherein the plurality of artificial intelligence software agents are implemented for at least a portion of said plurality of users associated with the job matching service, and wherein the artificial intelligence software agents are initialized based at least in part on a plurality of unique access tokens that determine parameters to be used for a rank aggregation task;

deploying the rank aggregation task to a task execution computing environment, wherein the deploying comprises generating a unique task identifier based at least in part on a description of the rank aggregation task and sending the unique task identifier to the task execution computing environment;

executing the rank aggregation task in the task execution computing environment based at least in part on the determined parameters, wherein the rank aggregation task comprises a collaborative decision-making game performed by the plurality of artificial intelligence software agents, wherein the artificial intelligence software agent corresponding to a given one of the users is initialized based at least in part on the one or more rankings from the given user, and wherein the collaborative decision-making game generates a unified ranking for each of the plurality of candidates for each of the job clusters and comprises:

initiating a handshake process between the task execution computing environment and the agent execution computing environment based on the unique task identifier;

obtaining, based on the handshake process, probability distributions generated by the plurality of artificial intelligence software agents, wherein each of the probability distributions represents the initial set of rankings for a corresponding of the artificial intelligence software agents, and iteratively updating the probability distribution for each given artificial intelligence software agent based on at least one other probability distribution corresponding to at least one of the other artificial intelligence software agents until a convergence criterion is satisfied, wherein the iteratively updating is based on a global objective function configured to preserve the initial set of rankings of each of the plurality of artificial intelligence software agents while reducing overlap of the candidates between each of the job clusters;

selecting, for each of the jobs in a given one of the job clusters, individual candidates from among the set of candidates corresponding to the given job cluster based on the unified ranking determined for the given on of the job clusters, wherein the selecting comprises reducing intra-cluster conflict with respect to the plurality of candidates using a reinforcement-based machine learning model; and outputting, to the job matching service via an application programming interface, one or more optimized lists of the plurality of candidates for said plurality of jobs based on the identifying and the selecting;

wherein the method is carried out by at least one computing device.

2. The computer-implemented method of claim 1, wherein the clustering process is based on one or more of:
  a similarity between at least two or more of said plurality of jobs; and
  whether at least two of said plurality of jobs are associated with a same segment of a particular business entity.

3. The computer-implemented method of claim 1, comprising:
  obtaining preference data from the one or more respective users of the plurality of users associated with the job matching service, wherein the preference data comprises the one or more rankings.

4. The computer-implemented method of claim 1, wherein said reducing said inter-cluster conflict and reducing said intra-cluster conflict comprises at least one of:
  ensuring a minimum number of candidates are selected for each of said plurality of jobs; and
  ensuring a minimum number of candidates having unified rankings exceeding a threshold value for a particular one of the jobs is selected for the particular job.

5. The computer-implemented method of claim 4, wherein said threshold value is based on a priority of the particular job relative to the other jobs.

6. The computer-implemented method of claim 1, wherein said selecting comprises training the reinforcement-based machine learning model to optimize a loss function.

7. The computer-implemented method of claim 1, wherein the collaborative decision-making game is implemented based at least in part on a size corresponding to a mixed integer problem solved by the mixed integer programming process.

8. The computer-implemented method of claim 1, wherein the artificial intelligence software agent corresponding to the given one of the users is further initialized based on priority weights of the given user for the plurality of jobs.

9. A computer program product comprising a computer readable storage medium having program instructions embodied therewith, the program instructions executable by a computing device to cause the computing device to:
  obtain data corresponding to a plurality of jobs from at least two job data sources and a plurality of candidates from a job matching service;
  process the obtained data from the at least two job data sources using a clustering process to generate a plurality of job clusters, wherein each of the job clusters comprises one or more of the plurality of jobs;
  identify, for each respective one of the job clusters, a set of candidates from among the plurality of candidates, wherein said identifying comprises reducing inter-cluster conflict with respect to the plurality of candidates using a mixed integer programming process, wherein the mixed integer programming process is constrained by one or more computing resource limitations corresponding to at least one of memory and processing resources, and wherein the mixed integer programming process is further constrained by a specified candidate overlap threshold between the generated job clusters and a minimum number of candidates required for each of the jobs;

obtain one or more rankings from one or more respective users of a plurality of users associated with the job matching service, wherein a given one of the rankings ranks at least a portion of said plurality of candidates with respect to at least one of the plurality of jobs;

deploy each of a plurality of artificial intelligence software agents to an agent execution computing environment with a respective set of initial rankings, wherein the plurality of artificial intelligence software agents are implemented for at least a portion of said plurality of users associated with the job matching service, and wherein the artificial intelligence software agents are initialized based at least in part on a plurality of unique access tokens that determine parameters to be used for a rank aggregation task;

deploy the rank aggregation task to a task execution computing environment, wherein the deploying comprises generating a unique task identifier based at least in part on a description of the rank aggregation task and sending the unique task identifier to the task execution computing environment;

execute the rank aggregation task in the task execution computing environment based at least in part on the determined parameters, wherein the rank aggregation task comprises a collaborative decision-making game performed by the plurality of artificial intelligence software agents, wherein the artificial intelligence software agent corresponding to a given one of the users is initialized based at least in part on the one or more rankings from the given user, and wherein the collaborative decision-making game generates a unified ranking for each of the plurality of candidates for each of the job clusters and comprises:

initiating a handshake process between the task execution computing environment and the agent execution computing environment based on the unique task identifier;

obtaining, based on the handshake process, probability distributions generated by the plurality of artificial intelligence software agents, wherein each of the probability distributions represents the initial set of rankings for a corresponding of the artificial intelligence software agents, and iteratively updating the probability distribution for each given artificial intelligence software agent based on at least one other probability distribution corresponding to at least one of the other artificial intelligence software agents until a convergence criterion is satisfied, wherein the iteratively updating is based on a global objective function configured to preserve the initial set of rankings of each of the plurality of artificial intelligence software agents while reducing overlap of the candidates between each of the job clusters;

select, for each of the jobs in a given one of the job clusters, individual candidates from among the set of candidates corresponding to the given job cluster based on the unified ranking determined for the given on of the job clusters, wherein the selecting comprises reducing intra-cluster conflict with respect to the plurality of candidates using a reinforcement-based machine learning model; and output, to the job matching service via an application programming interface, one or more optimized lists of the plurality of candidates for said plurality of jobs based on the identifying and the selecting.

10. The computer program product of claim 9, wherein the clustering process is based on one or more of:
  a similarity between at least two or more of said plurality of jobs; and
  whether at least two of said plurality of jobs are associated with a same segment of a particular business entity.

11. The computer program product of claim 9, wherein the program instructions executable by a computing device cause the computing device to:
  obtain preference data from the one or more respective users of the plurality of users associated with the job matching service, wherein the preference data comprises the one or more rankings.

12. The computer program product of claim 9, wherein said reducing said inter-cluster conflict and reducing said intra-cluster conflict comprises at least one of:
  ensuring a minimum number of candidates are selected for each of said plurality of jobs; and
  ensuring a minimum number of candidates having unified rankings exceeding a threshold value for a particular one of the jobs is selected for the particular job.

13. The computer program product of claim 12, wherein said threshold value is based on a priority of the particular job relative to the other jobs.

14. The computer program product of claim 9, wherein the collaborative decision-making game is implemented based at least in part on a size corresponding to a mixed integer problem solved by the mixed integer programming process.

15. A system comprising:
  a memory; and
  at least one processor operably coupled to the memory and configured for:
    obtaining data corresponding to a plurality of jobs from at least two job data sources and a plurality of candidates from a job matching service;
    processing the obtained data from the at least two job data sources using a clustering process to generate a plurality of job clusters, wherein each of the job clusters comprises one or more of the plurality of jobs;
    identifying, for each respective one of the job clusters, a set of candidates from among the plurality of candidates, wherein said identifying comprises reducing inter-cluster conflict with respect to the plurality of candidates using a mixed integer programming process, wherein the mixed integer programming process is constrained by one or more computing resource limitations corresponding to at least one of memory and processing resources, and wherein the mixed integer programming process is further constrained by a specified candidate overlap threshold between the generated job clusters and a minimum number of candidates required for each of the jobs;
    obtaining one or more rankings from one or more respective users of a plurality of users associated with the job matching service, wherein a given one of the rankings ranks at least a portion of said plurality of candidates with respect to at least one of the plurality of jobs;

deploying each of a plurality of artificial intelligence software agents to an agent execution computing environment with a respective set of initial rankings, wherein the plurality of artificial intelligence software agents are implemented for at least a portion of said plurality of users associated with the job matching service, and wherein the artificial intelligence software agents are initialized based at least in part on a plurality of unique access tokens that determine parameters to be used for a rank aggregation task;

deploying the rank aggregation task to a task execution computing environment, wherein the deploying comprises generating a unique task identifier based at least in part on a description of the rank aggregation task and sending the unique task identifier to the task execution computing environment;

executing the rank aggregation task in the task execution computing environment based at least in part on the determined parameters, wherein the rank aggregation task comprises a collaborative decision-making game performed by the plurality of artificial intelligence software agents, wherein the artificial intelligence software agent corresponding to a given one of the users is initialized based at least in part on the one or more rankings from the given user, and wherein the collaborative decision-making game generates a unified ranking for each of the plurality of candidates for each of the job clusters and comprises:

initiating a handshake process between the task execution computing environment and the agent execution computing environment based on the unique task identifier;

obtaining, based on the handshake process, probability distributions generated by the plurality of artificial intelligence software agents, wherein each of the probability distributions represents the initial set of rankings for a corresponding of the artificial intelligence software agents, and iteratively updating the probability distribution for each given artificial intelligence software agent based on at least one other probability distribution corresponding to at least one of the other artificial intelligence software agents until a convergence criterion is satisfied, wherein the iteratively updating is based on a global objective function configured to preserve the initial set of rankings of each of the plurality of artificial intelligence software agents while reducing overlap of the candidates between each of the job clusters;

selecting, for each of the jobs in a given one of the job clusters, individual candidates from among the set of candidates corresponding to the given job cluster based on the unified ranking determined for the given on of the job clusters, wherein the selecting comprises reducing intra-cluster conflict with respect to the plurality of candidates using a reinforcement-based machine learning model; and outputting, to the job matching service via an application programming interface, one or more optimized lists of the plurality of candidates for said plurality of jobs based on the identifying and the selecting.

16. The system of claim 15, wherein the clustering process is based on one or more of:
  a similarity between at least two or more of said plurality of jobs; and
  whether at least two of said plurality of jobs are associated with a same segment of a particular business entity.

17. The system of claim 15, wherein the at least one processor is further configured for:
  obtaining preference data from the one or more respective users of the plurality of users associated with the job matching service, wherein the preference data comprises the one or more rankings.

18. The system of claim 15, wherein said reducing said inter-cluster conflict and reducing said intra-cluster conflict comprises at least one of:
  ensuring a minimum number of candidates are selected for each of said plurality of jobs; and
  ensuring a minimum number of candidates having unified rankings exceeding a threshold value for a particular one of the jobs is selected for the particular job.

19. The system of claim 18, wherein said threshold value is based on a priority of the particular job relative to the other jobs.

20. The system of claim 18, wherein the artificial intelligence software agent corresponding to the given one of the users is further initialized based on priority weights of the given user for the plurality of user jobs.

* * * * *